United States Patent
Al-Jlil et al.

(10) Patent No.: US 9,242,878 B2
(45) Date of Patent: Jan. 26, 2016

(54) HEAVY METAL REMOVAL FROM WASTE STREAMS

(71) Applicant: King Abdulaziz City for Science and Technology, Riyadh (SA)

(72) Inventors: Saad A. Al-Jlil, Riyadh (SA); Omar A. Al-Harbi, Riyadh (SA)

(73) Assignee: KING ABDULAZIZ FOR SCIENCE AND TECHNOLOGY, Riyadh (SA)

( * ) Notice: Subject to any disclaimer, the term of this patent is extended or adjusted under 35 U.S.C. 154(b) by 202 days.

(21) Appl. No.: 14/166,195

(22) Filed: Jan. 28, 2014

(65) Prior Publication Data

US 2014/0138322 A1    May 22, 2014

Related U.S. Application Data

(62) Division of application No. 13/732,717, filed on Jan. 2, 2013, now Pat. No. 8,679,349, which is a division of application No. 12/777,639, filed on May 11, 2010, now Pat. No. 8,663,480.

(51) Int. Cl.

| | |
|---|---|
| *C02F 1/28* | (2006.01) |
| *C02F 1/62* | (2006.01) |
| *C02F 1/52* | (2006.01) |
| *C02F 5/02* | (2006.01) |
| *C02F 101/20* | (2006.01) |
| *C02F 101/22* | (2006.01) |
| *C02F 103/06* | (2006.01) |
| *C02F 103/16* | (2006.01) |

(52) U.S. Cl.
CPC . *C02F 1/62* (2013.01); *C02F 1/281* (2013.01); *C02F 1/5236* (2013.01); *C02F 5/02* (2013.01); *C02F 2101/20* (2013.01); *C02F 2101/22* (2013.01); *C02F 2103/06* (2013.01); *C02F 2103/16* (2013.01); *C02F 2209/02* (2013.01); *C02F 2209/06* (2013.01)

(58) Field of Classification Search
CPC .......... C02F 1/281; C02F 1/5236; C02F 5/02; C02F 1/62; C02F 2101/20; C02F 2103/06; C02F 2103/16; C02F 2209/02; C02F 2209/06; C02F 2101/22
See application file for complete search history.

(56) References Cited

U.S. PATENT DOCUMENTS

| | | |
|---|---|---|
| 2,359,748 A | 10/1944 | Clemens |
| 3,890,225 A | 6/1975 | Kajiyama |
| 3,963,640 A | 6/1976 | Smith |
| 4,059,513 A | 11/1977 | Zadera |
| 4,338,200 A | 7/1982 | Zeijlstra |
| 4,576,714 A | 3/1986 | Pohoreski |

(Continued)

OTHER PUBLICATIONS

Aziz et al., "Removal of Copper from Water Using Limestone Filtration Technique Determination of Mechanism of Removal", Environment International vol. 26, 01-01, pp. 395-399.

(Continued)

*Primary Examiner* — Matthew O Savage
(74) *Attorney, Agent, or Firm* — Andrew M. Calderon; Roberts Mlotkowski Safran & Cole, P.C.

(57) ABSTRACT

A method for removing heavy metals from contaminated water, comprising collecting metal salt precipitates from a water softening process, drying said precipitates, contacting water having a concentration of one or more heavy metals with said precipitates, and collecting water having a reduced concentration of said heavy metal(s).

6 Claims, 1 Drawing Sheet

(56) References Cited

U.S. PATENT DOCUMENTS

| | | |
|---|---|---|
| 5,266,210 A | 11/1993 | McLaughlin |
| 5,370,827 A | 12/1994 | Grant et al. |
| 5,601,704 A | 2/1997 | Salem et al. |
| 2009/0184054 A1 | 7/2009 | Crawford et al. |

OTHER PUBLICATIONS

Baker et al., "Reuse of Lime Sludge from Water Softening and Coal Combustion Byproducts", Iowa Department of Transportation, Dec. 2004, 6 pages.

GE Handbook of Industrial Water Treatment, 08-08, Retrieved Jun. 27, 2012, URL: http://www.gewater.com/handbook/ext_treatment_7>.

Ghazy et al., "Removal of Lead from Water Samples by Sorption onto Powdered Limestone", Separation Science and Technology, vol. 2, Issue 3, Feb. 2007, pp. 653-667.

GE Handbook of Industrial Water Treatment, 08-08, Retrieved Jun. 27, 2012, URL: http://www.gewater.com/handbook/ext_treatment_ch_4_aeration.jsp>.

GE Handbook of Industrial Water Treatment, 08-08, Retrieved Jun. 27, 2012, URL: http://www.gewater.com/handbook/ext_treatment_ch_6_filtration.jsp>.

Prescott, "Aluminates of Potassium and Sodium in Solution", The Chemical News, vol. 42, Jul. 16, 2880, pp. 29-30.

HEAVY METAL REMOVAL FROM WASTE STREAMS

CROSS REFERENCE TO RELATED APPLICATIONS

This application is a divisional of U.S. patent application Ser. No. 13/732,717 filed on Jan. 2, 2013, now U.S. Pat. No. 8,679,349. U.S. patent application Ser. No. 13/732,717 is a divisional of U.S. patent application Ser. No. 12/777,639 filed on May 11, 2010, now U.S. Pat. No. 8,663,480.

FIELD OF THE INVENTION

The invention relates to an adsorbent for removing heavy metals from contaminated water, and more particularly, to a process for decontaminating a heavy metal contaminated stream of water.

BACKGROUND OF THE INVENTION

In the area of water treatment, such as ground water or industrial waste water treatment, there is an ever-increasing need to remove undesirable and even toxic contaminants, particularly heavy metal contaminants, from water. Many industrial processes utilize aqueous solutions of heavy metals, such as lead, in manufacture of batteries, and chromium or copper in electroplating solutions.

Unfortunately, the removal of such heavy metals from the aqueous solutions used in these processes has proven to be not only difficult but expensive. Prior art processes have utilized quite expensive adsorbents, such as activated carbon, activated sludge, various types of natural clays, carbon aerogels, coirpith carbon, natural zeolites and even date pits. Likewise, heavy metal removal can be accomplished through expensive ion exchange resins.

U.S. Published Patent Application No. 2009/0184054 to Crawford et al., incorporated by reference herein, discloses an adsorptive bed having hydrous iron oxide and calcium carbonate materials. The adsorptive bed is useful in water treatment applications for removing metal contaminants, particularly for removing arsenic-containing ions.

U.S. Pat. No. 4,059,513 to Zadera, incorporated by reference herein, discloses treating high sulfate content water in a multistage process to remove sulfate and hardness. Sulfate concentration is reduced in the first stage of the process by addition of calcium hydroxide. Calcium concentration is reduced in the second stage of the process by reaction of carbon dioxide or bicarbonate and calcium and hydroxide ions from the first stage of the process, forming insoluble calcium carbonate.

U.S. Pat. No. 5,601,704 to Salem et al., incorporated by reference herein, discloses an automatic feedback control system for a water treatment apparatus, such as a recirculating solids contact clarifier, that maintains steady-state operation of the clarifier by accurately measuring the concentration of suspended solids at designated portions of the clarifier and automatically adjusting clarifier variables to maintain optimum conditions despite changes in the inlet flow rate, composition or temperature.

U.S. Pat. No. 5,266,210 to McLaughlin, incorporated by reference herein, discloses treating wastewater contaminated with heavy metals in a multi-stage process. In a first stage, wastewater is treated with an effective amount of calcium oxide and/or calcium hydroxide in the form of lime to adjust the pH so that various metals in the water become insoluble. Gypsum formation may also occur if sulfate ions are present in the wastewater. In a second stage, an effective amount of sodium carbonate is added in the form of soda ash to allow formation of calcium carbonate. In a third stage, a coagulant, preferably a polymer, is added to facilitate the formation of a sludge comprising heavy metals, gypsum and calcium carbonate. In a final stage, the pH of the resulting effluent may be adjusted with a suitable acid, such as hydrochloric acid, to attain acceptable discharge requirements. The sludge formed is substantially stable and dewatered and has low toxic metal leaching characteristics.

U.S. Pat. No. 4,338,200 to Zeijlstra, incorporated by reference herein, discloses a process for the removal of heavy metal ions, particularly chromium, lead and/or zinc ions, from aqueous liquids by precipitation wherein the aqueous liquid containing the heavy metal ions and an aqueous liquid containing a base which precipitates the heavy metal ions in the form of their hydroxide or basic salt are added simultaneously to an amount of water at a pH between 5 and 10 and a temperature between 60° and 100° C. and the pH and the temperature are maintained in the specified ranges during the precipitation.

U.S. Pat. No. 5,370,827 to Grant et al., incorporated by reference herein, discloses treating solutions such as for example drinking water, ground water and extracting solutions contaminated with heavy metals and radioactive species, singly or in combination, by first treating the contaminated solution with silicate and ammonium hydroxide solution precipitants. Then the contaminated solution is separately treated with an acid which gels, polymerizes and/or precipitates the contaminant-containing silica matrix to form an easily dewaterable and separable solid. The solid contaminants are readily removed from the cleansed solution by filtration means. The process utilizes a novel combination of steps which maximizes contaminant removal, minimizes waste volume, and produces a treatable waste solid. The preferred precipitants are sodium silicate, and ammonium hydroxide. The preferred mineral acid is hydrochloric acid.

However, none of the above-discussed references discloses or suggests a relatively inexpensive but highly effective adsorbent composition for removal of heavy metal contaminants from contaminated water streams. Accordingly, there exists a need in the art to overcome the deficiencies and limitations described hereinabove.

SUMMARY OF THE INVENTION

In a first embodiment, the invention is directed to a method for removing heavy metals from contaminated water, comprising collecting metal salt precipitates from a water softening process, drying said precipitates, contacting water having a concentration of one or more heavy metals with said precipitates, and collecting water having a reduced concentration of said heavy metal(s).

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

Figure 1:
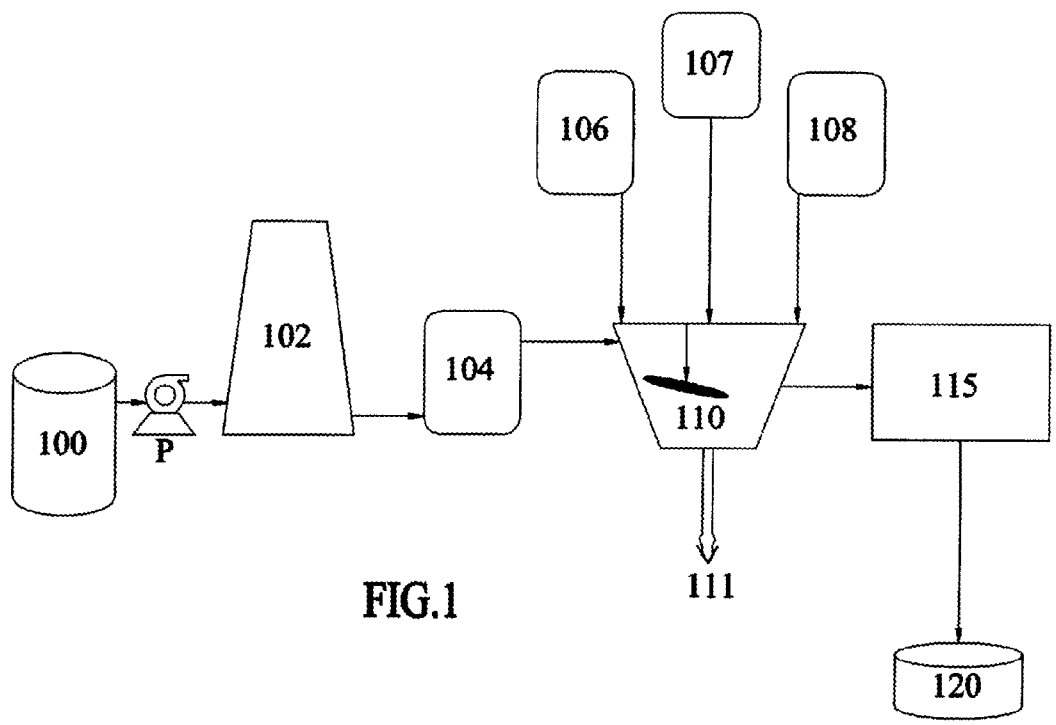
FIG. 1 shows a groundwater treatment system for forming adsorbent precipitates according to the present invention.

The invention relates to an adsorbent composition for removing heavy metals from contaminated water, and more particularly, to a process for decontaminating a heavy metal contaminated stream of water.

Generally, the groundwater is used as drinking water in many places without any treatment and is problematic due to its hardness. The main source of hardness in water is high concentrations of Ca and Mg salts. It is well-known in the art to treat groundwater to remove the dissolved salts in a process often referred-to as "softening". One such process is known as the cold lime-soda ash process. Briefly, to soften water by this process, lime (calcium hydroxide) is added to the water to precipitate the calcium bicarbonate as calcium carbonate and the magnesium salts as magnesium hydroxide. Soda ash (sodium carbonate) is added to the water to react with the calcium chloride and calcium sulfate originally present in the water as well as that formed by the reaction of lime with magnesium chloride and sulfate. The reaction of sodium carbonate with these salts forms calcium carbonate. Thus, the hardness (calcium and magnesium salts) originally present in the water is partially removed as the slightly soluble compounds, calcium carbonate and magnesium hydroxide, precipitate out.

Usually a coagulant such as alum, sodium aluminate, ferric sulfate or suitable polymer is employed in the treatment to assist in the separation of the turbidity, precipitates and other solids formed from the water. If sterilization and reduction in organic matter are required, chlorine is also used in the treatment. By suitable modification in the chemical treatment, silica reduction can be obtained.

The precipitates from the cold lime-soda ash process are typically discarded as waste. However, the present inventors have determined that these metal salt precipitates can be advantageously employed as adsorbents for heavy metal contaminants in industrial process wastewater.

Thus, according to the present invention, in order to remove the hardness of water for recycling (FIG. 1), well water 100 is pumped P into a cooler 102 and aerated, which results in precipitation of ferrous/ferric oxide. The percentage of Fe remaining in water after this step is very low (1.39%). The water is then passed through a sand filter 104 to remove suspended solids and the purified water from the sand filter is passed to a precipitation chamber 110 for treatment with lime ($Ca(OH)_2$) 106, Soda ($Na_2CO_3$) 108 and Sodium Aluminate ($Na_4Al_2O_5$) 107 at a ratio of about 27/70/3 of the respective components to remove hardness and silicates. This chemical treatment process results in the precipitation of Ca and Mg salts such as $CaCO_3$, $Mg(OH)_2$, $MgCO_3$ and a complex of Sodium-Aluminum-Silicate by chemical reactions. Since the solubility constant of these salts is very low, they precipitate and settle in the bottom of the precipitation chamber 110 as solid waste, which are removed at 111. Those of skill in the art recognize that the softened water exiting chamber 110 can be forwarded to a reverse osmosis system 115 to further purify the water, which is subsequently stored in a fresh/drinking water tank 120.

This solid waste material (a mixture of Ca and Mg salts and complex of Sodium-Aluminum-Silicate) from the precipitation chamber is collected as a paste, dried in an oven at 60-75° C. to remove moisture and ground into particulate having high surface area. The ground precipitates are then used as adsorbent for the removal of heavy metal ions, such as Cu, Cr and Pb, from industrial wastewater to obtain clean water for the development of landscape and industrial cooling. It has been observed that up to 90%, even up to 100% of these metals can be removed with this technology, which is much less expensive as compared to other conventional technologies used for wastewater treatment for the removal of heavy metals.

The solid waste material obtained from this process can be applied to different industrial units. Some major industries facing heavy metal contamination problems are those conducting electroplating processes FIG. 2, such as chrome (Cr) and copper (Cu) plating, as well as manufacturers of lead (Pb) batteries. In an electroplating process, the electroplating solution is stored in tank 200, and forwarded through pump P to the electroplating bath/tank 210. Contaminated wastewater is withdrawn from tank 210 through line 212 via another pump P and forwarded to batch adsorption unit 215, which contains the ground precipitate adsorbents collected from precipitation chamber 110 (FIG. 1). The ground metal precipitate adsorbents are mixed in the contaminated wastewater and stirred at a temperature and time sufficient to result in thorough contact between the wastewater and the adsorbents. Advantageously, the pH in the batch adsorption unit 215 is maintained at a pH above 4, preferably between pH 4 and pH 5, such as about pH 4.5. Subsequently, the treated water is forwarded to a filter 220, and sent downstream for various suitable uses.

The main advantages of this invention is that it will remove the hazardous metals from the waste effluents from different industries and render it suitable for landscape irrigation or recycling in the same industrial units for cooling purposes. Also if the treated water is intended for land disposal, the associated environmental hazards will be minimized. In addition, another advantage of this invention is that the adsorbent is very inexpensive, but unusually and unexpectedly effective in removing heavy metals from industrial wastewater. The removal method is effective in removing heavy metals including lead, chromium, copper, zinc, cadmium and combinations thereof. We have found that heavy metal contamination industrial wastewater is reduced by more than about 90%, even as much as about 100%.

Example 1

Well water was collected and softened in the manner illustrated in FIG. 1, by passing it through a sand filter, cooling it to a temperature of about 30° C. and subsequently passing it into a precipitation chamber. A solution of sodium aluminate (0.5 g/L) was added with stirring to reduce silicates, followed by the addition of lime (5 g/L) and soda (13 g/L). Stirring was continued at a temperature of about 30° C. and at pH between about 9-9.5. A precipitate was collected in the form of a wet paste and dried in an oven at a temperature between about 60-75° C. Water evaporated from the process was condensed and diverted back to the drinking water tank. The dried paste was crushed into particulate having a cumulative pore surface area (for pores between about 17 and 3000 angstroms) of about 30 $m^2/g$, a cumulative pore volume of about 0.0703 $cm^3/g$, and an average pore diameter of about 93 angstroms, as calculated by the BJH adsorption method.

Example 2

Figure 2:
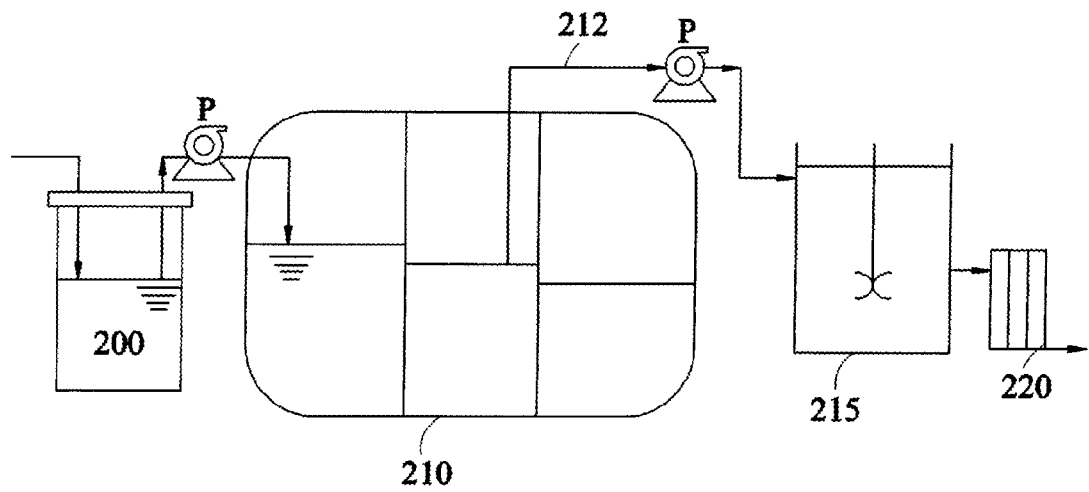
FIG. 2 shows an electroplating system including a batch adsorption unit for removing heavy metals from contaminated waste water.

A solution typical of contaminated wastewater from a battery manufacturing process was produced having a concentration of Pb ions of about 2127 mg/L, and was contacted with the dried particulate collected in Example 1 in a batch process as illustrated in FIG. 2, at a temperature of about 30° C. and at pH between about 4-4.5. After treatment the water was analyzed and found to contain 0 mg/L of Pb ions, an essentially 100% removal efficiency.

Example 3

A solution typical of contaminated wastewater from a copper electroplating bath was produced having a concentration of Cu ions of about 1800 mg/L, and was contacted with the dried particulate collected in Example 1 in a batch process as illustrated in FIG. 2, at a temperature of about 30° C. and at pH between about 4-4.5. After treatment the water was analyzed and found to contain 0 mg/L of Cu ions, an essentially 100% removal efficiency.

Example 4

A solution typical of contaminated wastewater from a chromium electroplating bath was produced having a concentration of Cr ions of about 1460 mg/L, and was contacted with the dried particulate collected in Example 1 in a batch process as illustrated in FIG. 2, at a temperature of about 30° C. and at pH between about 4-4.5. After treatment the water was analyzed and found to contain 0 mg/L of Cr ions, an essentially 100% removal efficiency.

The foregoing examples have been provided for the purpose of explanation and should not be construed as limiting the present invention. While the present invention has been described with reference to an exemplary embodiment, changes may be made within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed:

1. A method for removing heavy metals from contaminated water, comprising collecting metal salt precipitates from a water softening process, wherein said metal salt precipitates include calcium salts, magnesium salts, and sodium aluminate salts, drying said metal salt precipitates to produce dried metal salt precipitates, contacting water having a concentration of one or more heavy metals with said dried metal salt precipitates, and collecting water having a reduced concentration of said heavy metal(s), wherein the water softening process includes:

collecting well water and passing the well water through a sand filter;
cooling the filtered water;
after the cooling, passing the water to a precipitation chamber;
adding a solution of sodium aluminate to the water in the precipitation chamber; and
after the adding the sodium aluminate, adding lime and soda to the water in the precipitation chamber.

2. The method of claim 1, wherein the collecting the metal salt precipitates comprises collecting a wet paste from the precipitation chamber after the adding the sodium aluminate, the lime, and the soda to the water in the precipitation chamber.

3. The method of claim 2, wherein the drying said metal salt precipitates to produce dried metal salt precipitates comprises:

drying the wet paste to form a dried paste; and
crushing the dried paste into a dried particulate.

4. The method of claim 3, wherein the contacting water having a concentration of one or more heavy metals with said dried metal salt precipitates comprises:

adding the dried particulate to contaminated wastewater from a battery manufacturing process having a concentration of Pb ions of about 2127 mg/L.

5. The method of claim 3, wherein the contacting water having a concentration of one or more heavy metals with said dried metal salt precipitates comprises:

adding the dried particulate to contaminated wastewater from a copper electroplating bath having a concentration of Cu ions of about 1800 mg/L.

6. The method of claim 3, wherein the contacting water having a concentration of one or more heavy metals with said dried metal salt precipitates comprises:

adding the dried particulate to contaminated wastewater from a chromium electroplating bath was produced having a concentration of Cr ions of about 1460 mg/L.

* * * * *